(12) United States Patent
Kobayashi

(10) Patent No.: US 8,960,926 B2
(45) Date of Patent: Feb. 24, 2015

(54) PROJECTOR AND METHOD FOR CONTROLLING SAME

(75) Inventor: Michio Kobayashi, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 181 days.

(21) Appl. No.: 13/579,246

(22) PCT Filed: Mar. 3, 2010

(86) PCT No.: PCT/JP2010/053410
§ 371 (c)(1),
(2), (4) Date: Aug. 15, 2012

(87) PCT Pub. No.: WO2011/108088
PCT Pub. Date: Sep. 9, 2011

(65) Prior Publication Data
US 2012/0314192 A1    Dec. 13, 2012

(51) Int. Cl.
*G03B 21/14*    (2006.01)
*G03B 9/06*    (2006.01)
*H04N 9/31*    (2006.01)
*G03B 21/20*    (2006.01)

(52) U.S. Cl.
CPC ............... *G03B 9/06* (2013.01); *H04N 9/315* (2013.01); *G03B 21/2053* (2013.01)
USPC ............................................. 353/85; 353/97

(58) Field of Classification Search
USPC ..................................................... 353/85, 97
See application file for complete search history.

(56) References Cited

U.S. PATENT DOCUMENTS

| | | | |
|---|---|---|---|
| 6,783,248 B2 | 8/2004 | Miyata | |
| 6,979,960 B2 | 12/2005 | Okawa et al. | |
| 7,055,966 B2 * | 6/2006 | Momose et al. | 353/97 |
| 7,438,420 B2 | 10/2008 | Harada et al. | |
| 7,575,330 B2 * | 8/2009 | Allen et al. | 353/85 |
| 7,748,854 B2 * | 7/2010 | Sugino et al. | 353/97 |
| 7,841,723 B2 | 11/2010 | Tanaka | |
| 7,922,337 B2 * | 4/2011 | Glent-Madsen | 353/85 |

(Continued)

FOREIGN PATENT DOCUMENTS

| | | |
|---|---|---|
| CN | 1439115 A | 8/2003 |
| CN | 1510504 A | 7/2004 |

(Continued)

OTHER PUBLICATIONS

International Search Report in PCT/JP2010/053410 dated Apr. 6, 2010 (English Translation Thereof).

(Continued)

*Primary Examiner* — William C Dowling
(74) *Attorney, Agent, or Firm* — McGinn IP Law Group, PLLC

(57) ABSTRACT

In order to minimize a change in the luminance of a projected image caused by a lamp refreshing process, projector 10 according to the present invention includes lamp refreshing controller 13 which, upon detecting that the lighting power of lamp 15 is lower than rated power thereof for a given period of time, increases the lighting power of lamp 15 to the rated power and, after elapse of a predetermined period of time, reduces the lighting power to an original level thereof, and aperture data generator 16 which controls the aperture of optical diaphragm 18 depending on a change in the lighting power to keep constant the amount of light passing through optical diaphragm 18.

20 Claims, 4 Drawing Sheets

(56) References Cited

U.S. PATENT DOCUMENTS

| | | | |
|---|---|---|---|
| 7,993,017 B2* | 8/2011 | Yamada et al. | 353/97 |
| 8,111,000 B2 | 2/2012 | Pekarski | |
| 8,653,753 B2* | 2/2014 | Yamada et al. | 315/307 |
| 2004/0136134 A1 | 7/2004 | Okawa et al. | |
| 2005/0068505 A1 | 3/2005 | Momose et al. | |
| 2007/0200955 A1 | 8/2007 | Harada et al. | |
| 2009/0091272 A1 | 4/2009 | Yamada et al. | |
| 2009/0244496 A1 | 10/2009 | Sugino et al. | |
| 2012/0008105 A1* | 1/2012 | Katou | 353/85 |
| 2013/0127931 A1* | 5/2013 | Shioya et al. | 345/690 |
| 2013/0128241 A1* | 5/2013 | Shioya et al. | 353/85 |

FOREIGN PATENT DOCUMENTS

| | | |
|---|---|---|
| CN | 101411186 A | 4/2009 |
| JP | 2003-295320 A | 10/2003 |
| JP | 2004-207018 A | 7/2004 |
| JP | 2004-264819 A | 9/2004 |
| JP | 2007-212852 A | 8/2007 |
| JP | 2008-527405 A | 7/2008 |
| JP | 2008-270058 A | 11/2008 |
| JP | 2009-093862 A | 4/2009 |
| WO | WO 2006/132167 A1 | 12/2006 |

OTHER PUBLICATIONS

Japanese Office Action dated Nov. 19, 2013, with partial English translation.

Chinese Office Action dated Apr. 17, 2014 with English translation.

* cited by examiner

PROJECTOR AND METHOD FOR CONTROLLING SAME

TECHNICAL FIELD

The present invention relates to a projector and a method of controlling same.

BACKGROUND ART

High-pressure discharge lamps (hereinafter referred to as "lamp") have been used as a general light source for projectors. While a lamp is being lighted, a halogen cycle is caused wherein an electrode substance that is evaporated from electrodes of the lamp by the electric discharge between the electrodes is deposited on the electrodes again by the action of the halogen gas that is sealed in the light emission tube of the lamp. Reduction in the operating life of the lamp and the occurrence of flickering of the lamp can be minimized by appropriately controlling the halogen cycle. The halogen cycle can be controlled based on the lighting power of the lamp, the frequency at which the lamp is lit, and the temperature of the lamp, etc.

There are instances wherein the lamp cannot be lighted with rated power to cause a stable halogen cycle as when the lamp is used with low electric power to reduce the power consumption of the projector. In those instances, the lamp characteristics are degraded, i.e., the service life of the lamp is shortened and lamp flickering occurs. As a countermeasure, a method of recovering lamp characteristics by temporarily changing the lighting power of a lamp is disclosed in Patent document 1 (JP2009-093862A).

According the method disclosed in Patent document 1, if the lighting power of the lamp is lower than the rated power for a certain period of time or longer, then a lamp refreshing process is carried out to temporarily increase the lighting power of the lamp up to the rated power at appropriate time intervals. When the lamp refreshing process is carried out, the lamp characteristics can be recovered.

However, changing the lighting power of the lamp leads to changing the lamp luminance, resulting in a change in the luminance of images projected by the projector. Consequently, the user is required to determine the timing to start the lamp refreshing process and to recognize in advance that the luminance of projected images will change.

According to a projector wherein the amount of ight output from a lamp is adjusted by an optical diaphragm disposed in a light path, as disclosed in Patent document 2 (JP2004-264819A), the lighting power of the lamp and the optical diaphragm can be simultaneously controlled to adjust the luminance of projected images. The disclosed projector, however, is aimed at increasing the contrast of projected images, and serves to regulate the amount of lighting power and the amount of optical diaphragm relative to each other based on an input video signal, and is unable to deal with a change in the luminance of projected images in the lamp refreshing process.

CITATION LISTS

Patent Document

Patent document 1: JP2009-093862A
Patent document 2: JP2004-264819A

SUMMARY OF THE INVENTION

Problems to be Solved by the Invention

The method disclosed in Patent document 1 is problematic in that the luminance of images projected by the projector changes.

The projector disclosed in Patent document 2 does not deal with a change in the luminance of projected images in the lamp refreshing process.

It is an object of the present invention to provide a projector and a method of controlling same which can solve the above problems.

To achieve the above object, according to the present invention, a projector having a lamp and an optical diaphragm for adjusting the amount of light emitted from the lamp, comprises:

a lamp refreshing controller which, upon detecting the lighting power that lights said lamp as being lower than rated power of the lamp for a given period of time, increases the lighting power to the rated power, and, after elapse of a predetermined period of time, reduces the lighting power to an original level thereof; and an aperture data generator which controls the aperture of the optical diaphragm depending on a change in the lighting power to keep constant the amount of light passing through the optical diaphragm.

To achieve the above object, according to the present invention, a method of controlling a projector including a lamp and an optical diaphragm for adjusting the amount of light emitted from the lamp, comprises:

upon detecting the lighting power that lights said lamp as being lower than rated power of the lamp for a given period of time, increasing, with a lamp refreshing controller, the lighting power to the rated power, and, after elapse of a predetermined period of time, reducing, with the lamp refreshing controller, the lighting power to an original level thereof; and controlling, with an aperture data generator, the aperture of the optical diaphragm depending on a change in the lighting power to keep constant the amount of light passing through the optical diaphragm.

According to the present invention, upon detecting the lighting power that lights the lamp as being lower than rated power of the lamp for a given period of time, the projector increases the lighting power to the rated power, and, after elapse of a predetermined period of time, reduces the lighting power to the original level thereof, and controls the aperture of the optical diaphragm depending on a change in the lighting power to keep constant the amount of light passing through the optical diaphragm.

By controlling the aperture of the optical diaphragm depending on a change in the lighting power of the lamp, a change in the luminance of a projected image is minimized when a lamp refreshing process is performed.

MODE FOR CARRYING OUT THE INVENTION

Exemplary embodiments of the present invention will be described below with reference to the drawings.

First Exemplary Embodiment

Figure 1:
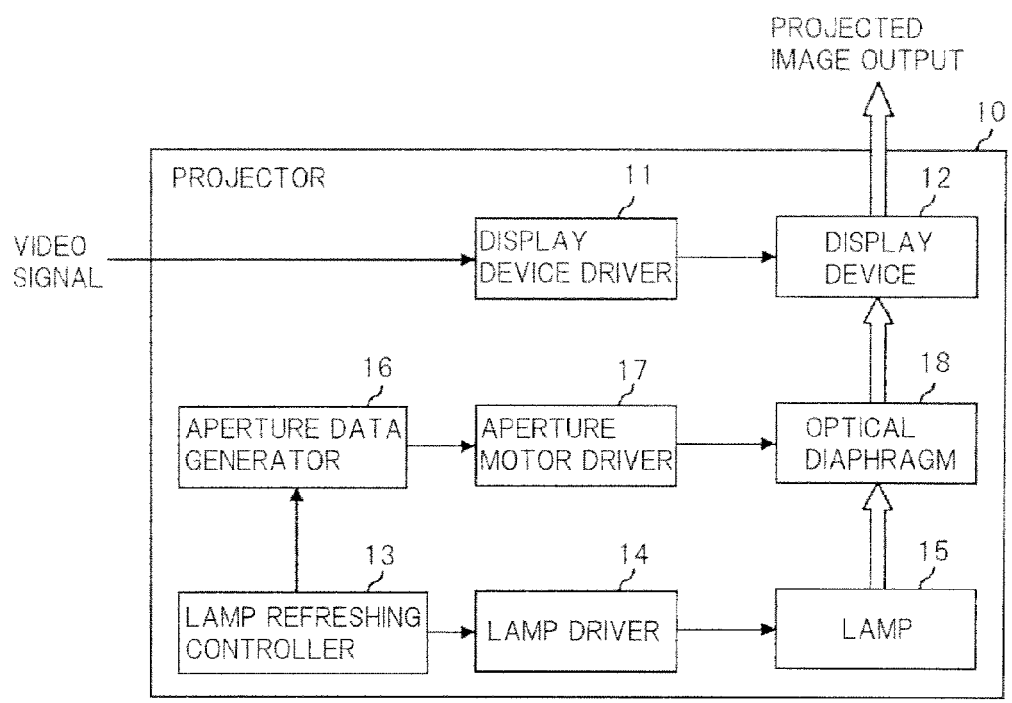
FIG. 1 is a block diagram showing the configuration of a projector according to a first exemplary embodiment of the invention.

FIG. 1 is a block diagram showing the configuration of a projector according to a first exemplary embodiment of the invention.

Projector 10 shown in FIG. 1 includes display device driver 11, display device 12, lamp refreshing controller 13, lamp driver 14, lamp 15, aperture data generator 16, aperture motor driver 17, and optical diaphragm 18.

In FIG. 1, solid-line arrows represent the inputting and outputting of electric signals, and the blank arrows represent the inputting and outputting of light signals.

A video signal given from an external source is input to display device driver 11.

Display device driver 11 drives display device 12 depending on the video signal.

Display device 12 comprises, for example, a transmissive liquid crystal panel of a general structure, and modulates light emitted from lamp 15.

If lamp refreshing controller 13 detects when the lighting power of lamp 15 is lower than rated power thereof for a certain period of time or longer, then lamp refreshing controller 13 outputs a lighting power control signal indicative of lighting power to be output to lamp driver 14 and aperture data generator 16. The rated power refers to electric power that causes a stable halogen cycle, and includes dimmer-mode (economic-mode) electric power. Generally, electric power in a dimmer mode ranges from 75% to 80% of maximum power that causes a stable halogen cycle.

Lamp driver 14 outputs lighting power for lighting lamp 15 based on the lighting power control signal output from lamp refreshing controller 13.

Lamp 15 is lighted by the lighting power output from lamp driver 14, and emits light to illuminate display device 12.

Aperture data generator 16 determines the aperture of optical diaphragm 18 based on the lighting power control signal output from lamp refreshing controller 13, and outputs an aperture control signal for adjusting the aperture of optical diaphragm 18 to aperture motor driver 17.

Aperture motor driver 17 adjusts the aperture of optical diaphragm 18 based on the apertune control signal output from aperture data generator 16.

Optical diaphragm 18, which is disposed between display device 12 and lamp 15, adjusts the amount of light emitted from lamp 15.

Figure 2:
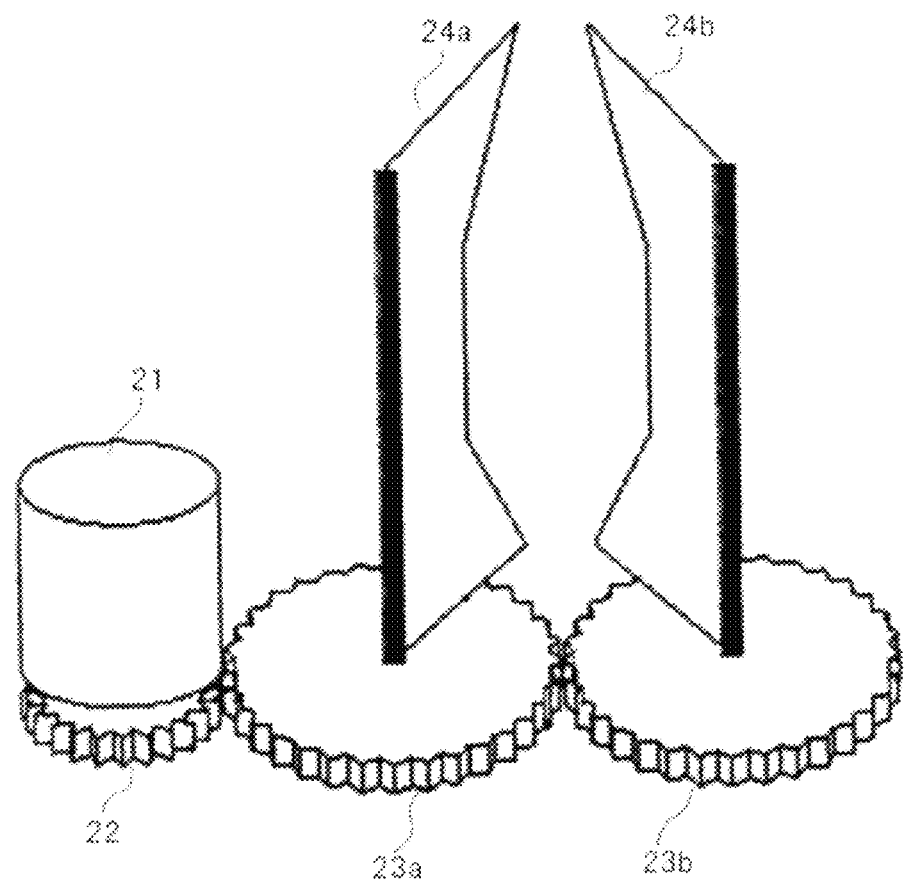
FIG. 2 is a view showing an example of the structure of an optical diaphragm shown in FIG. 1.

FIG. 2 is a view showing an example of the structure of optical diaphragm 18.

As shown in FIG. 2, optical diaphragm 18 includes aperture motor 21, gears 22, 23a, 23b, and light shield plates 24a, 24b mounted respectively on the rotational shafts of gears 23a, 23b.

When aperture motor driver 17 drives aperture motor 21, aperture motor 21 rotates its rotational shaft, rotating gear 22. Since gear 22 and gear 23a mesh with each other and gear 23a and gear 23b mesh with each other, the rotation of gear 22 causes gears 23a, 23b to rotate, changing the opening/closing angle of light shield plates 24a, 24b to adjust the aperture of optical diaphragm 18. In other words, the aperture of optical diaphragm 18 can be adjusted by controlling the angular position of aperture motor 21.

Operation of projector 10 will be described below.

Figure 3:
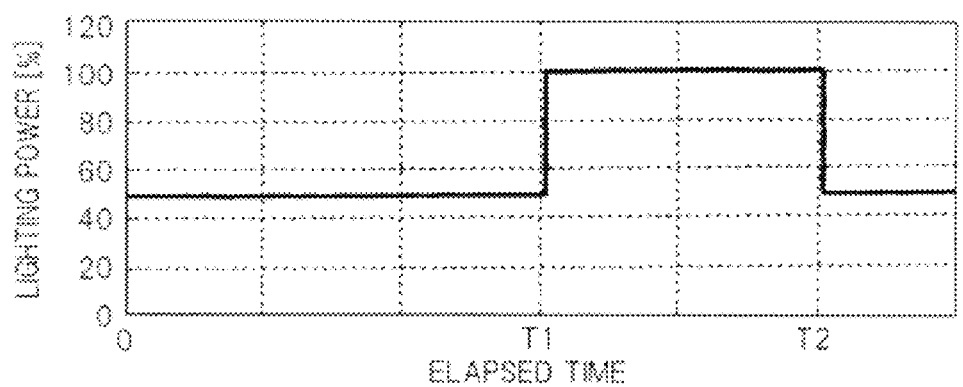
FIG. 3 is a diagram showing an example of time-dependent changes in lighting power for a lamp shown in FIG. 1.

FIG. 3 is a diagram showing an example of time-dependent changes in lighting power of lamp 15.

As shown in FIG. 3, it is assumed that after projector 10 is driven, lamp 15 is lighted with lighting power which is 50% of rated power.

At time T1, if lamp refreshing controller 13 detects a low electric power lighting mode for lighting lamp 15 with lighting power which is lower than rated power for a certain period of time or longer, then lamp refreshing controller 13 performs a lamp refreshing process in order to recover the lamp characteristics. Specifically, lamp refreshing controller 13 outputs a lighting power control signal to lamp driver 14 and aperture data generator 16 in order to increase the lighting power up to the rated power between time T1 and time T2 and in order to decrease the lighting power down to the original lighting power (electric power which is 50% of the rated power) at time T2.

Lamp driver 14 increases the lighting power up to the rated power between time T1 and time T2 and decreases the lighting power down to 50% of the rated power at time T2, according to the lighting power control signal output from lamp refreshing controller 13, as shown in FIG. 3.

The period (between time T2 and time T3) during which the lamp refreshing process is carried out may be a period of time required for the evaporated electrode substance to be deposited sufficiently on the electrodes for recovering the lamp characteristics. Depending on the size and structure of lamp 15, the period generally takes several minutes compared with the period of several tens of minutes for lighting lamp 15 that is lighted with low electric power.

Specifically, if the lighting lamp 15 that is lighted with low electric power has stayed lit for 10 minutes with the electric power which is 50% of the rated power, then lamp 15 is lighted with the rated power for 1 minute, and thereafter lighted again with the low electric power which is 50% of the rated power. The rated power at this time may be in the dimmer mode. If the lighting lamp 15 that was lighted with low electric power has stayed lit for 30 minutes with the electric power which is 25% of the rated power, then lamp 15 is lighted in the dimmer mode for 5 minutes, and thereafter lighted again with the low electric power which is 25% of the rated power. The lighting in the dimmer mode may be replaced with lighting with 100% electric power which is maximum electric power to cause a stable halogen cycle. In other words, the value and time of lighting power in the lamp refreshing process may be determined depending on the level of electric power and the lighting time for lighting lamp 15 that is lighted with low electric power.

The period of time in which to perform the lamp refreshing process is determined in advance by measurements or the like and stored in lamp refreshing controller 13.

Then, aperture data generator 16 determines the aperture of optical diaphragm 18 based on the lighting power control signal output from lamp refreshing controller 13 in order to correct a change in the luminance of a projected image which is caused by the lamp refreshing process.

A specific process of correcting a change in the luminance of a projected image will be described below.

Figure 4:
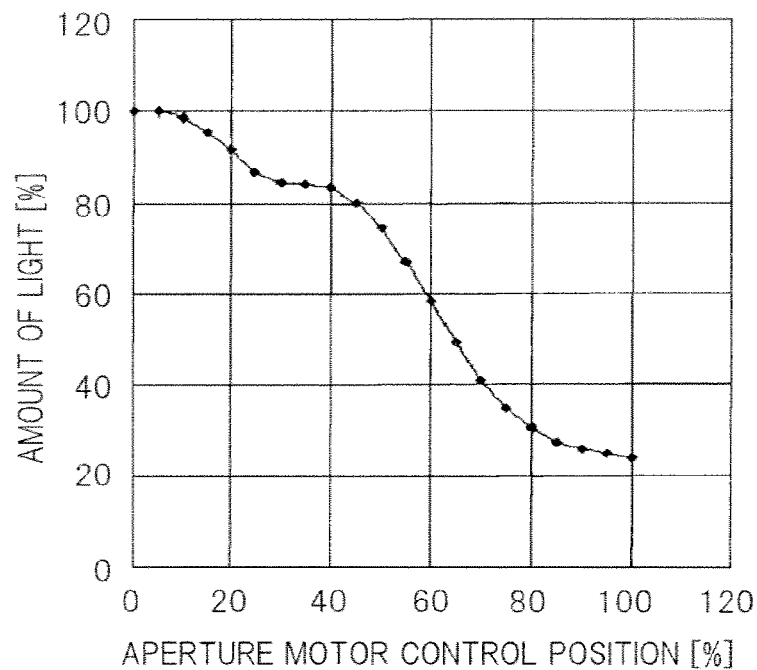
FIG. 4 is a diagram showing an example of the characteristics of changes in the amount of light caused by the optical diaphragm shown in FIG. 1.

FIG. 4 is a diagram showing an example of the characteristics of changes in the amount of light caused by optical diaphragm 18.

In FIG. 4, the horizontal axis represents the control position of aperture motor 21. When the control position of aperture motor 21 is 0%, it indicates that optical diaphragm 18 is open (the aperture is minimum), and when the control position of aperture motor 21 is 100%, it indicates that optical diaphragm 18 is maximally reduced (the aperture is maximum).

In FIG. 4, the vertical axis represents the ratio of the amounts of light passing through optical diaphragm 18 at respective control positions with respect to the amount of light passing through optical diaphragm 18 when optical diaphragm 18 is open.

As shown in FIG. 4, as the aperture is greater, the amount of light passing through optical diaphragm 18 is smaller, and the luminance of a projected image is lower.

The relationship between the control position of aperture motor 21 and the amount of light passing through optical diaphragm 18, i.e., the relationship between the control position of aperture motor 21 and the aperture of optical diaphragm 18, is not linear.

It is assumed below that when lamp 15 is lighted with electric power which is 50% of the rated power, the control position of aperture motor 21 is 0%.

Figure 5:
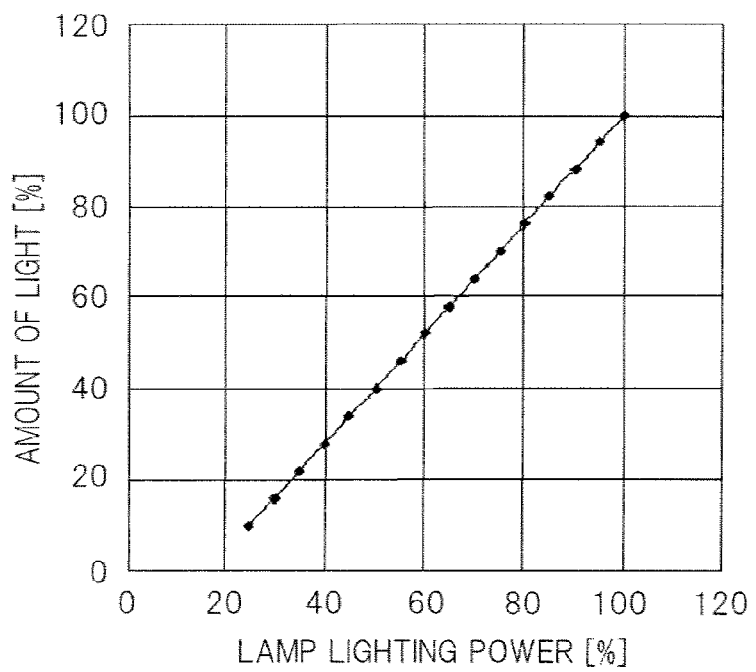
FIG. 5 is a diagram showing the characteristics of changes in the amount of light caused by the lighting power of the lamp shown in FIG. 1.

FIG. 5 is a diagram showing the characteristics of changes in the amount of ght caused by the lighting power of lamp 15.

In FIG. 5, the horizontal axis represents the ratio of the lighting power to the rated power of lamp 15, and the vertical axis represents the ratio of the amounts of light emitted when lamp 15 is lighted with respective levels of lighting power to the amount of light emitted when lamp 15 is lighted with the rated power.

As shown in FIG. 5, the lighting power of lamp 15 and the amount of light emitted therefrom are generally in a proportional relationship.

Aperture data generator 16 stores in advance the characteristics shown in FIGS. 4 and 5, and generates an aperture control signal based on those characteristics.

For example, if the lighting power is 50% of the rated power, then the amount of light emitted from lamp 15 is 40% of the amount of light emitted from lamp 15 if it is lighted with the rated power, as can be seen from the characteristics shown in FIG. 5. In order to keep the luminance of a projected image unchanged when lamp 15 is lighted with the rated power, it is necessary to adjust the amount of light passing through optical diaphragm 18 to 40% of the amount of light passing through optical diaphragm 18 if lamp 15 is lighted with the rated power. It can be seen from the characteristics shown in FIG. 4 that the amount of light passing through optical diaphragm 18 is 40% when the control position of aperture motor 21 is 70%.

Consequently, aperture data generator 16 outputs an aperture control signal to motor driver 17 to change the control position of aperture motor 21 from 0% to 70%. Motor driver 17 then drives aperture motor 21 according to the aperture control signal.

Since the aperture of optical diaphragm 18 is adjusted based on the change in the lighting power, it is possible to correct a change in the luminance of a projected image. When lamp 15 is to be lighted again with low electric energy at time T2, it is also possible to similarly correct a change in the luminance of a projected image.

According to the present exemplary embodiment, as described above, when the lighting power of lamp 15 is changed by the lamp refreshing process, projector 10 controls the aperture of optical diaphragm 18 to keep constant the amount of light passing through optical diaphragm 18 depending on the change in the lighting power.

Inasmuch as the aperture of optical diaphragm 18 is adjusted depending on a change in the lighting power, a change in the luminance of a projected image which is caused by the lamp refreshing process can be minimized.

Second Exemplary Embodiment

According to the first exemplary embodiment, lighting power is changed once when the lamp refreshing process is performed.

Generally, however, the response time of a change in the luminance of a projected image according to positional control by aperture motor 21 is slow compared with the response time of a change in the luminance of light emitted from lamp 15 according to lighting power control. In addition, while the lighting power of lamp 15 and luminance changes are in a proportional relationship, as shown in FIG. 5, the control position of aperture motor 21 and changes in the amount of light passing through optical diaphragm 18 are not in a proportional relationship, as shown in FIG. 4. Therefore, it is difficult to keep the luminance of a projected image constant even if the response times according to lighting power control and positional control by aperture motor 21 are combined with each other.

According to the present exemplary embodiment, lamp refreshing controller 13 changes lighting power of lamp 15 stepwise when it performs lamp refreshing control.

Figure 6:
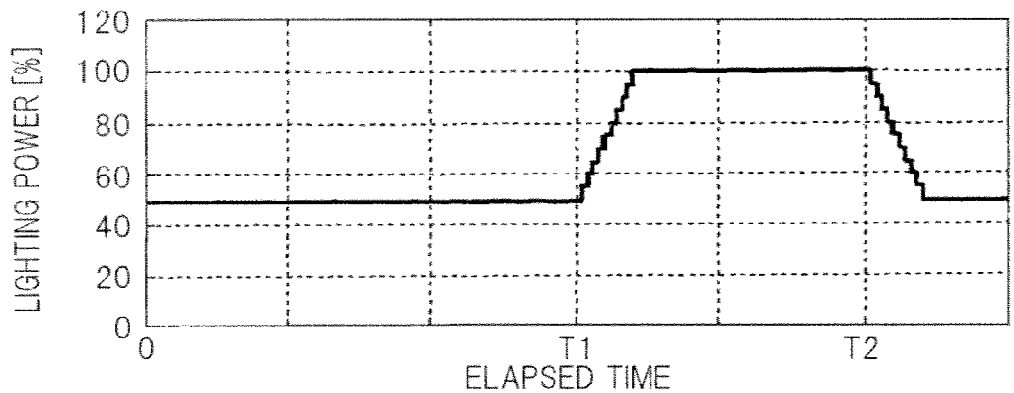
FIG. 6 is a diagram showing an example of time-dependent changes in lighting power or a lamp according to a second exemplary embodiment of the invention.

FIG. 6 is a diagram showing an example of time-dependent changes in lighting power of lamp 15 according to the present exemplary embodiment.

As shown in FIG. 6, lamp refreshing controller 13 starts to change lighting power at time T1 and brings it up to the rated power in 10 steps.

According to the present exemplary embodiment, furthermore, aperture data generator 16 determines the degree of opening of optical diaphragm 18 at the respective steps of lighting power, i.e., control positions of aperture motor 21, and generates an aperture control signal.

Figure 7:
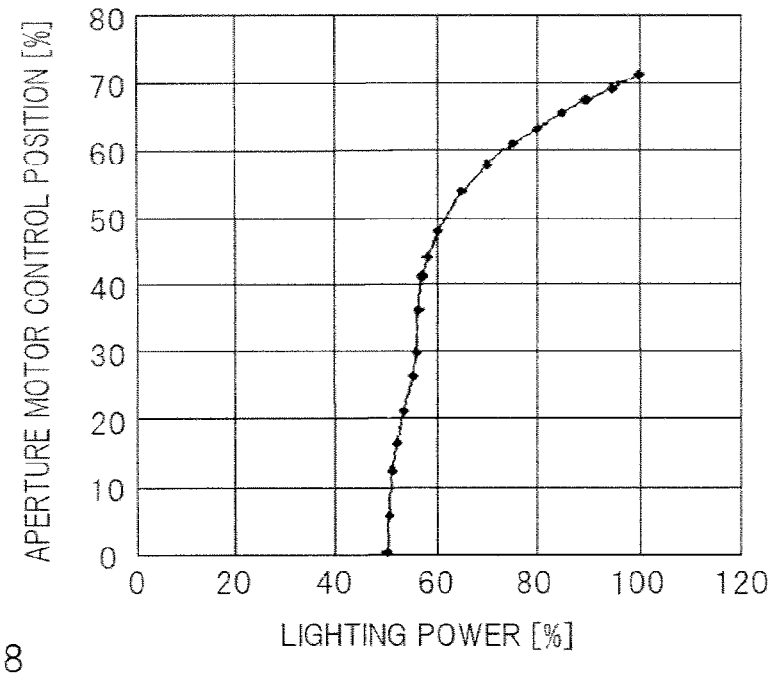
FIG. 7 is a diagram showing the relationship between the lighting power for a lamp and the control position of an aperture motor.

FIG. 7 is a diagram showing the relationship between the lighting power of lamp 15 and the control position of aperture motor 21 in order to keep the luminance of a projected image constant. FIG. 7 shows the characteristics of the control position of aperture motor 21 in order to keep the luminance of a projected image constant at each level of lighting power, with respect to the control position (0%) of aperture motor 21 at the time the lighting power of lamp 15 is 50% of the rated power.

Aperture data generator 16 stores in advance the characteristics shown in FIG. 7, and determines the control position of aperture motor 21 for each step of lighting power based on those characteristics.

Figure 8:
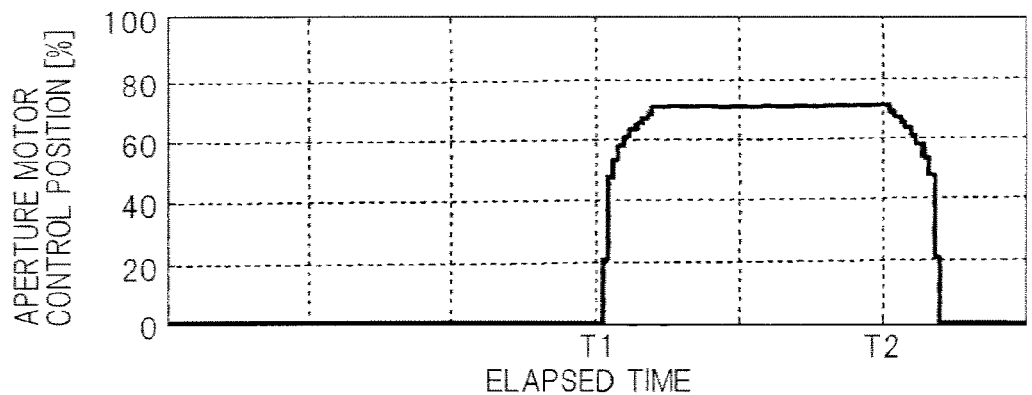
FIG. 8 is a diagram showing an example of time-dependent changes in the control position of the aperture motor according to the second exemplary embodiment of the invention.

FIG. 8 is a diagram showing an example of time-dependent changes in the control position of aperture motor 21 according to the present exemplary embodiment.

As shown in FIG. 8, the control position of aperture motor 21 changes stepwise as the lighting power changes stepwise.

In actual implementation, lamp refreshing controller 13 realizes the electric power changes shown in FIG. 6 with minute electric power changes in the lighting power of lamp 15 and at minute changing intervals, which are established separately. For example, if the minute electric power changes are 5% notches of the rated power and the minute changing intervals are of 1 second each, then lamp refreshing controller 13 changes the lighting power from 50% of the rated power up to the rated power in 10 steps over 10 seconds. Aperture data generator 16 stores in advance the characteristics in the table format shown in FIG. 7, and determines the control position of aperture motor 21 for each step of lighting power based on those characteristics.

When the lighting power is to be lowered from the rated power to 50% thereof, aperture data generator 16 also performs positional control of aperture motor 21 based on characteristics in a table format. In this case, however, aperture data generator 16 does not store the characteristics shown in FIG. 7 used when the lighting power is to be increased, but stores characteristics when the lighting power is to be reduced and realizes positional control using the stored characteristics.

In other words, aperture data generator 16 uses different characteristics when the lighting power of lamp 15 is to be increased and reduced.

This is because optical diaphragm 18 is actuated using the gears, and the characteristics are different when the electric power is to be increased and reduced due to backlash of the gears.

According to the present exemplary embodiment, as described above, projector 10 changes the lighting power of lamp 15 stepwise when it performs the lamp refreshing process.

Therefore, it is not necessary to bring, into accurate conformity with each other, the characteristics and response time of changes in the amount of light with respect to changes in the lighting power of lamp 15 and the characteristics and response time of changes in the amount of light with respect to control positions of aperture motor 21. Accordingly, projector 10 can be easily implemented.

In the first and second exemplary embodiments, optical diaphragm 18 is disposed between display device 12 and lamp 15. However, optical diaphragm 18 may not necessarily be thus positioned, but may be disposed behind display device 12.

With optical diaphragm 18 being disposed behind display device 12, the characteristics stored in aperture data generator 16 with respect to the lighting power of lamp 15 and the control position of aperture motor 21 may be changed accordingly.

It has been described above that the lighting power is increased up to the rated power including the dimmer mode when a lighting lamp 15 that has been lighted with low electric power stays lit for a certain period of time. However, the lighting power may be increased up to a level of electric power (e.g., 70% of the rated power) required for eliminating lamp blackening and electrode damage, rather than being increased up to the rated power.

The present invention has been described above in reference to the exemplary embodiments. However, the present invention is not limited to the above exemplary embodiments. Rather, various changes that can be understood by those skilled in the art within the scope of the invention may be made to the arrangements and details of the present invention.

The invention claimed is:

1. A projector including a lamp and an optical diaphragm for adjusting an amount of light emitted from said lamp, said projector comprising:
   a lamp refreshing controller which, upon detecting a lighting power that lights said lamp as being lower than a rated power of said lamp for a given period of time, increases the lighting power to the rated power, and, after an elapse of a predetermined period of time, reduces the lighting power to an original level thereof; and
   an aperture data generator which controls an aperture of said optical diaphragm depending on a change in the lighting power to keep constant an amount of light passing through said optical diaphragm,
   wherein said lamp refreshing controller determines a value of the lighting power at a time that the lighting power is to be increased to the rated power, and the predetermined period of time based on a value of the lighting power and a period of time that the lamp has been lighted with the lighting power before the lighting power is to be increased to the rated power.

2. The projector according to claim 1, wherein said lamp refreshing controller changes the lighting power stepwise.

3. The projector according to claim 1, wherein said predetermined period of time is equal to or greater than a period of time required to recover lamp characteristics according to a halogen cycle of said lamp.

4. The projector according to claim 1, further comprising:
   a display device for modulating the light emitted from said lamp,
   wherein said lamp, said optical diaphragm, and said display device are arranged in an order named along an optical path.

5. The projector according to claim 1, further comprising:
   a display device for modulating the light emitted from said lamp,
   wherein said lamp, said display device, and said optical diaphragm are arranged in an order named along an optical path.

6. The projector according to claim 2 wherein said predetermined period of time is equal to or greater than a period of time required to recover lamp characteristics according to a halogen cycle of said lamp.

7. The projector according claim 2, further comprising:
   a display device for modulating the light emitted from said lamp,
   wherein said lamp, said optical diaphragm, and said display device are arranged in an order named along an optical path.

8. The projector according claim 3, further comprising:
   a display device for modulating the light emitted from said lamp,
   wherein said lamp, said optical diaphragm, and said display device are arranged in an order named along an optical path.

9. The projector according to claim 2, further comprising:
   a display device for modulating the light emitted from said lamp,
   wherein said lamp, said display device, and said optical diaphragm are arranged in an order named along an optical path.

10. The projector according to claim 3, further comprising:
    a display device for modulating the light emitted from said lamp,
    wherein said lamp, said display device, and said optical diaphragm are arranged in an order named along an optical path.

11. The projector according to claim 1, wherein the lamp refreshing controller is configured to linearly change the amount of light emitted from said lamp to the lighting power of said lamp.

12. The projector according to claim 1, wherein the rated power is defined as an electric power that results in stability of a halogen cycle of said lamp, and the rated power includes a dimmer-mode electric power.

13. The projector according to claim 1, wherein a period of time during which the lamp refreshing controller increases the lighting power to the rated power is a period of time required for an evaporated electrode substance to be deposited on electrodes of said lamp for recovering characteristics of said lamp.

14. A method of controlling a projector including a lamp and an optical diaphragm for adjusting an amount of light emitted from said lamp, said method comprising:

upon detecting a lighting power that lights said lamp as being lower than a rated power of said lamp for a given period of time, increasing, with a lamp refreshing controller, the lighting power to said rated power, and, after an elapse of a predetermined period of time, reducing, with said lamp refreshing controller, the lighting power to an original level thereof;

controlling, with an aperture data generator, an aperture of said optical diaphragm depending on a change in the lighting power to keep constant an amount of light passing through said optical diaphragm; and determining a value of the lighting power at a time that the lighting power is to be increased to the rated power, and the predetermined period of time based on a value of the lighting power and a period of time that the lamp has been lighted with the lighting power before the lighting power is to be increased to the rated power.

15. The method according to claim 14, wherein said lamp refreshing controller changes said lighting power stepwise.

16. The method according to claim 14, wherein said predetermined period of time is equal to or greater than a period of time required to recover lamp characteristics according to a halogen cycle of said lamp.

17. The method according to claim 15, wherein said predetermined period of time is equal to or greater than a period of time required to recover lamp characteristics according to a halogen cycle of said lamp.

18. The method according to claim 14, wherein said controlling comprises linearly changing the amount of light emitted from said lamp to the lighting power of said lamp.

19. The method according to claim 14, wherein the rated power is defined as an electric power that results in stability of a halogen cycle of said lamp, and the rated power includes a dimmer-mode electric power.

20. The method according to claim 14, wherein a period of time during which the lamp refreshing controller increases the lighting power to the rated power is a period of time required for an evaporated electrode substance to be deposited on electrodes of said lamp for recovering characteristics of said lamp.

* * * * *